Jan. 29, 1935.  C. J. COBERLY  1,989,349
SEAL FOR ROTATING SHAFTS
Filed July 18, 1932
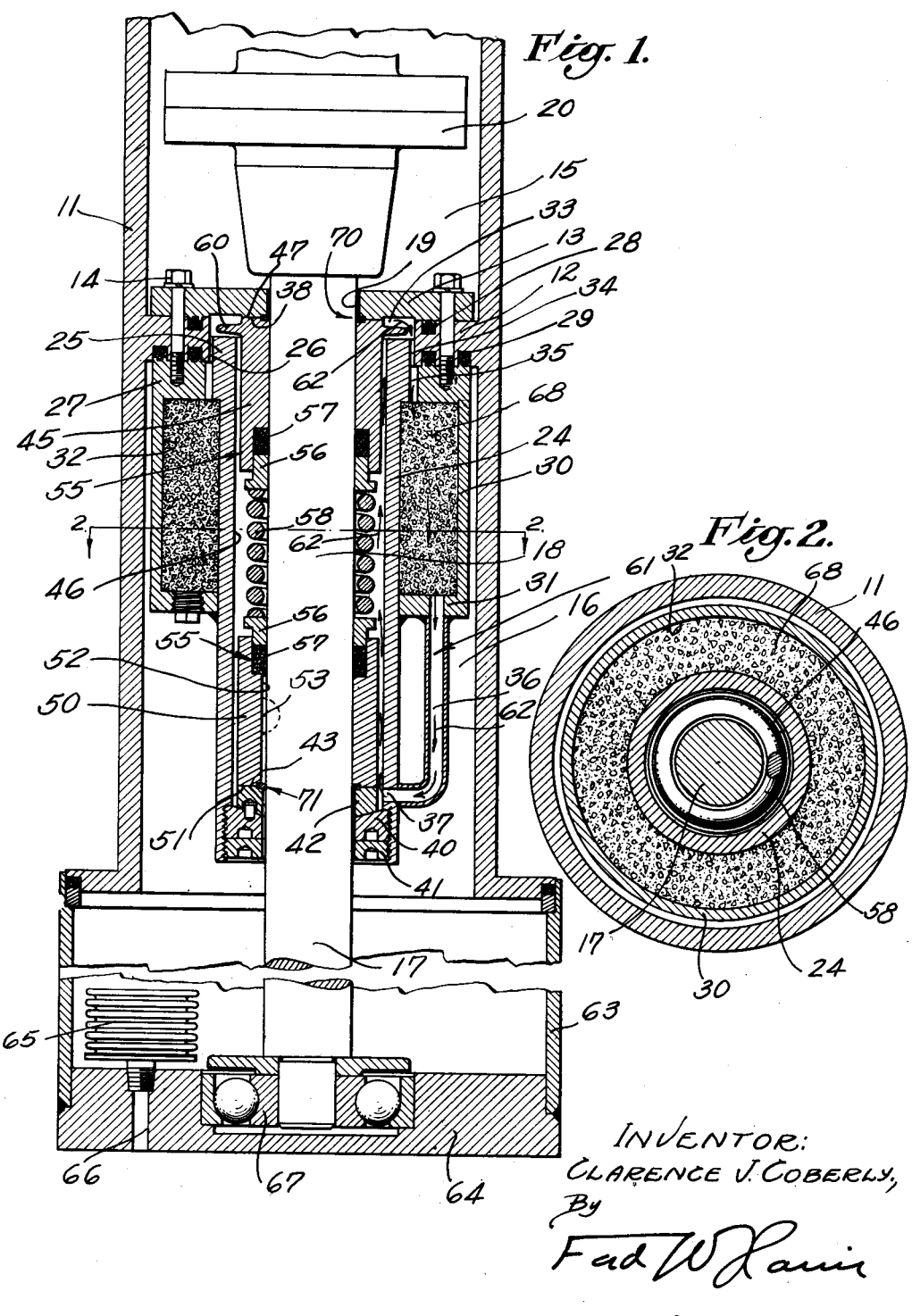
INVENTOR:
CLARENCE J. COBERLY,
By
Fad W Lanin
ATTORNEY.

Patented Jan. 29, 1935

1,989,349

UNITED STATES PATENT OFFICE 1,989,349

SEAL FOR ROTATING SHAFTS

Clarence J. Coberly, Los Angeles Calif., assignor to Submersible Motor Pump Co. Ltd., Los Angeles, Calif., a corporation of California Application July 18, 1932; Serial No. 623,172

29 Claims. (Cl. 286—9)

My invention relates to a packing device or stuffing box for use on a rotating, reciprocating, or stationary shaft which passes through adjacent bodies of fluid, this invention being characterized by its ability to prevent admixing of one fluid with the other. It is customary to form a stuffing box around the shaft by compressing packing material in an annular chamber formed around the shaft. When such a stuffing box is submerged in a fluid, it is found that some leakage therethrough will occur. Accordingly, such a stuffing box cannot be used between two fluids, one or both of which must be preserved from contamination by the other.

In many installations it is desirable to use such a submerged stuffing box to close the junction between a fluid-filled container and a shaft extending therefrom. I have found by equalizing the pressures of fluids which are in contact with opposite ends of a packing that the leakage through such packing will be materially decreased if not entirely eliminated. Such an expedient, however, does not prevent an admixture of the two fluids, for the reason that in the stuffing box, where the shaft is moving, there is a tendency for an admixture of the two fluids to be formed. For example, if the two fluids are respectively oil and water, an oil and water emulsion will form more or less slowly adjacent the end of the stuffing box or packing means confronting the body of oil.

It is an object of my invention to provide a device which will prevent such formation of emulsion from contaminating fluid in the chamber in which such emulsion is formed, this being accomplished by causing the emulsion to flow through a definite path after it is formed and providing in such path a positive means for separating the fluids so that the contaminating fluid will not flow out into the fluid desired to be held in virgin condition.

It is a further object of the invention to provide a means of the above character, in which means semi-effective seals which do not require frequent readjustment may be satisfactorily substituted for the commonly employed stuffing box and packing material.

In the preferred form of my invention a wall is disposed between the two fluids through which the shaft may extend, there being an opening in such wall for the shaft and a sealing means around the shaft at such opening for reducing the flow of fluid through the opening to a minimum. Such sealing means may be a stuffing box or may consist of faces respectively supported on the wall and on the shaft. Leading from the sealing means is a passage through which a small circulation of fluid is maintained, the result being that the admixture or emulsion formed at the sealing means is constantly directed through this passage. In this passage I employ a separating means for separating from the flow of fluid therethrough the small amount of fluid which has entered through the sealing means.

It is an object of the invention to provide in a device of the character set forth in the foregoing paragraph a separating means comprising a chemical having an affinity for the contaminating fluid content of the flow through the passage, materials which may be suitably employed for this purpose being calcium carbide, sodium hydroxide, silica gel, metallic sodium, metallic calcium, etc.

A further object of the invention is to provide a sealing device for operation between two fluids including a tubular wall adapted to surround the shaft at a point in its passage from one fluid to the other, this tubular wall having sealing means at both ends thereof which respectively seal off the interior of the tubular wall from the fluids which are to be kept from admixture.

Further objects and advantages of the invention will be made evident throughout the following part of the specification.

Referring to the drawing, which is for illustrative purposes only,

Fig. 1 is a vertically sectioned view of a preferred embodiment of my invention.

Fig. 2 is a cross section, to reduced scale, on a plane represented by the line 2—2 of Fig. 1.

In the preferred form of my invention I employ a cylindrical wall 11 having an inwardly extending flange 12 to which a dividing wall 13 is secured by means of screws 14, thereby dividing the interior of the wall 11 into two portions, or first and second chambers 15 and 16, in which separate bodies of fluid are contained. In an exemplary use of my invention in deep well pumps driven by submersible motors, the upper or first chamber 15 may be secured to the lower end of a turbine pump structure, and accordingly the fluid contained therein, which will be hereinafter referred to as the first fluid, is water. The lower or second chamber 16 is adapted to protectively contain the driving mechanism for the pump structure, such as an electric motor, which may be secured to the lower portion 17 of a shaft 18 which extends through an opening 19 in the wall 13 and has a coupling 20 thereon for connection to the impellers of the pump not shown. The fluid contained in the chamber 16 hereinafter referred to as the second fluid is preferably a non-hygroscopic oil which entirely fills the chamber 16 and therefore entirely submerges the mechanism, such as the motor not shown, which is contained therein and which has the purpose of operating the shaft 18. Adjacent the opening 19 is a tubular wall or member 24 which extends along the shaft 18 preferably within the second chamber 16. The tubular member 24 has an axial flange portion 25 at its upper end which projects into the concentric opening 26 of the inwardly directed flange 12, and is further provided with a radial flange 27 which is held against the lower face of the flange 12 by the screws 14 which pass through the flange 12 and threadedly engage the flange 27, thereby securing the tubular wall 24 in desired position around the shaft 18. Packing means, such as indicated at 28 and 29 are employed between the parts 12, 13, and 27. Adjacent the flange 27, cylindrical and radial walls 30 and 31 form an annular chamber 32 around the tubular wall 24. Within the flange 12 an annular space 33 is formed above the upper end portion 25 of the member 24, and this space 33 connects with the upper end of the chamber 32 through slots 34 in the outer face of the portion 25 and openings 35 through the inner portion of the flange 27, these openings forming a passage means communicating between the annular space 37 and a de-emulsifying means to be hereinafter described. From the lower wall 31 of the chamber 32 a tube 36 is connected to an opening 37 near the lower end of the tubular wall 24.

On the lower or inner face of the dividing wall 13 a radial face or primary sealing seat 38 is formed, and by means of threaded rings 40 and 41 an annular seat member 42 is supported within the lower end of the tubular wall 24, this member 42 having an upwardly directed radial face or sealing seat 43 formed thereon. A cylindrical closure member 45 to cooperate with the upper or primary seat 38 is mounted on the shaft 18 in the upper portion of the annular space or chamber 46 within the tubular wall 24, this closure member having an upwardly disposed annular face 47 adapted to engage the primary seat 38. For cooperation with the lower or secondary seat 43, a cylindrical closure member 50 is mounted on the lower portion of the shaft 18 within the annular space 46, such member 50 having a downwardly directed annular face 51 adapted to engage the secondary seat 43. The members 45 and 50 are splined on the shaft so that they may move vertically relative thereto and yet be rotated with the shaft in accordance with the illustration in conjunction with the member 50 showing a vertical key-way 52 therein engaged by a key 53 mounted in the shaft 18. The engagement of the face 47 with the primary seat 38 and the engagement of the face 51 with the primary seat 43 minimize, if not prevent, leakage between such faces. To prevent leakage of fluid through the bores of the closure members 45 and 50 into the annular space 46 of the tubular wall 24, packing boxes 55 are formed at the inner ends of the members 45 and 50, and the glands 56 thereof are forced relatively outwardly into engagement with bodies of packing material 57 by means of a compression spring 58, this spring also serving to spread the members 45 and 50 and to hold the faces 47 and 51 thereof in a desired pressural contact with the respective primary and secondary seats 38 and 43. On the upper portion of the closure member 45 a radial fin or pumping member 60 projects into the space 33.

The annular space 46, the space 33, the slots 34, the holes 35, the chamber 32, and the tube 36 constitute a circulation passage 61 connecting the ends of the tubular wall 24 and likewise connecting sealing means 70 and 71 formed at such ends of the member 24 by the seats 38 and 43 and their cooperating closure members 45 and 50. When the closure member 45 is in rotation, the pumping effect of the radial fin 60 produces a circulation flow through the passage 61, as indicated by arrows 62. In one use of the invention the lower or second chamber 16 and the circulation passage 61 are completely filled with oil, the chamber 16 being closed by a side wall structure 63 and a bottom wall 64 secured to the lower end of the cylindrical wall 11. To compensate for expansion and contraction of the body of oil due to temperature changes during the operation of the device, a movable wall, such as an expansible copper bellows 65, may be placed in the lower portion of the chamber 16 and connected with the exterior thereof through an opening 66 in the bottom wall 64 which may also support bearing means 67 for the lower end of the shaft 18. With the chamber 16 and the passage 61 thus filled with oil, the device is lowered into the fluid, such as water, in which it is to operate. This fluid enters the upper or first chamber 15 and fills the same and may entirely surround the chamber 16 so that the pressure thereof may be exerted through the passage 66 on the exterior of the bellows 65, thereby producing in the oil in the chamber 16 a pressure substantially equal to the water pressure on the outside of the chamber. The oil and water will be separated by the sealing means 70 at the upper end of the tubular wall 24, but it is characteristic of such sealing means that an emulsion of the separated fluids is formed; therefore, in the space 33 and above the radial fin 60 there will be in most instances a formation of a fine intermixture of oil and water, generally in the form of an emulsion. The pumping action of the fin 60 carries this emulsion outwardly and then downwardly through the slots 34 and the openings 35 into the chamber 32, the emulsion thereby forming a part of the circulation flow through the circulation passage 61.

It is the principal feature of the invention to provide in the path of the circulation flow, toward the sealing means 71, a means for removing the contaminating fluid or water from such circulation flow so that the circulation flow in the passage 61 which contacts and passes the sealing means 71 will be devoid of contamination, and therefore the possibility of moisture working through the sealing means 71 is substantially eliminated. For this purpose of removing contaminating fluid, in this instance water, the chamber 32 forming part of the circulation passage 61 is filled with a chemical or other substance 68 having an affinity for water and being capable of absorbing and holding such water. For this purpose I may use, in divided form or granules, calcium carbide, sodium hydroxide, silica gel, metallic sodium, metallic calcium, etc. As the circulation flow passes from the upper or primary sealing means 70 toward the lower or secondary sealing means 71, it is intercepted by the separating means. As the circulation flow passes through the material 68 in the chamber 32, the water is absorbed therefrom so that the portion of the flow which passes downwardly through the tube 36, past the inner end of the sealing means 71, and upwardly within the space 46 is comprised of dry oil, with the result that moisture cannot pass through the sealing means 71 into the chamber 16 to contaminate the oil therein. The material placed in the chamber 32 may be hygroscopic in character so as to absorb water or such contaminating fluid as the use of the invention may require the separating means to remove, or the material 68 may be filled with a chemical which will react with water upon contact therewith. Such a chemical might be the above mentioned metallic sodium or metallic calcium, both of which react with water to form hydroxides which are in themselves hygroscopic and therefore continue to absorb water after complete reaction of these metallic substances has taken place.

It will be further understood that the lower sealing means 71 may be eliminated in the practice of the invention for the reason that the fluid which flows outwardly from the sealing means 70 must pass through the means for removing the contaminating fluid and therefore discharge from the chamber 32 free of contamination. Accordingly, it is recognized that the lower end of the wall 24 may be left open, thereby providing an open communication of the lower extremity of the tube 36 with the chamber 16.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A stuffing box for use with a shaft and in a position between a first fluid and a second fluid disposed in first and second chambers, including: sealing means around said shaft between said fluids; walls forming a circulation passage having one end communicating with said sealing means and the other end thereof communicating with said second fluid in said second chamber, there being means for producing a circulation flow through said circulation passage; and means in said circulation passage in position to intercept the circulation flow from said sealing means toward said other end of said passage, said means being adapted to separate said first fluid from said circulation flow, and said means comprising a quantity of material having a positive affinity for said first fluid sufficient to extract contained first fluid from an emulsion of said first and second fluids.

2. A stuffing box for use with a shaft and in a position between a first fluid, which may contain moisture and a second fluid, which it is desired to keep from contamination by moisture disposed in first and second chambers, including: sealing means around said shaft between said fluids; walls forming a circulation passage having one end communicating with said sealing means and the other end thereof communicating with said second fluid in said second chamber, there being means for producing a circulation flow through said circulation passage; and means in said circulation passage in position to intercept the circulation flow from said sealing means toward said other end of said passage, said means comprising a quantity of hygroscopic material.

3. A stuffing box for use with a shaft and in a position between a first fluid and a second fluid disposed in first and second chambers, including: a sealing device surrounding said shaft between said first and second chambers, said sealing device having a circulation passage extending between the ends thereof, a primary sealing means around said shaft between one end of said passage and said first chamber, and a secondary sealing means around said shaft in a position between the other end of said passage and said second chamber, there being means for producing a circulation flow through said circulation passage from the end thereof near said primary sealing means to the end thereof near said secondary means; and means in said circulation passage in position to intercept the circulation flow from said primary sealing means toward said other end of said passage, said means being adapted to separate said first fluid from said circulation flow.

4. A stuffing box for use with a shaft and in a position between a first fluid and a second fluid disposed in first and second chambers, including: a sealing device surrounding said shaft between said first and second chambers, said sealing device having a circulation passage extending between the ends thereof, a primary sealing means around said shaft between one end of said passage and said first chamber, and a secondary sealing means around said shaft in a position between the other end of said passage and said second chamber, there being means for producing a circulation flow through said circulation passage; and means in said circulation passage in position to intercept the circulation flow from said primary sealing means toward said other end of said passage, said means comprising a quantity of material adapted to absorb contained first fluid from said circulation flow.

5. A stuffing box for use with a shaft and in a position between a first fluid and a second fluid disposed in first and second chambers, including: a sealing device surrounding said shaft between said first and second chambers, said sealing device having a circulation passage extending between the ends thereof, a primary sealing means around said shaft between one end of said passage and said first chamber, and a secondary sealing means around said shaft in a position between the other end of said passage and said second chamber, there being means for producing a circulation flow through said circulation passage; and means in said circulation passage in position to intercept the circulation flow from said primary sealing means toward said other end of said passage, said means being adapted to separate said first fluid from said circulation flow, and said means comprising a quantity of material having a positive affinity for said first fluid sufficient to extract contained first fluid from an emulsion of said first and second fluids.

6. A stuffing box for use with a shaft and in a position between a first fluid, which may contain moisture, and a second fluid, which it is desired to keep from contamination by moisture, disposed in first and second chambers, including: a sealing device surrounding said shaft between said first and second chambers, said sealing device having a circulation passage extending between the ends thereof, a primary sealing means around said shaft between one end of said passage and said first chamber, and a secondary sealing means around said shaft in a position between the other end of said passage and said second chamber, there being means for producing a circulation flow through said circulation passage; and means in said circulation passage in position to intercept the circulation flow from said primary sealing means toward said other end of said passage, said means comprising a quantity of hygroscopic material.

7. A stuffing box for use with a shaft and in a position between a first fluid and a second fluid disposed in first and second chambers, including: a tubular wall around said shaft in position between said chambers, there being a primary annular seat formed around said shaft at the end of said tubular wall confronting said first chamber and a secondary annular seat formed around said shaft at the end of said tubular wall confronting said second chamber; primary and secondary closure members on said shaft respectively engaging said primary and secondary seats of said tubular wall; means forming a passage connecting one end of said tubular wall with the other end thereof; means for producing a flow of fluid through said passage toward said secondary seat; and means in a position to intercept said flow, said means being adapted to separate first fluid from said flow.

8. A stuffing box for use with a shaft and in a position between a first fluid and a second fluid disposed in first and second chambers, including: a tubular wall around said shaft in position between said chambers, there being a primary annular seat formed around said shaft at the end of said tubular wall confronting said first chamber and a secondary annular seat formed around said shaft at the end of said tubular wall confronting said second chamber; primary and secondary closure members on said shaft respectively engaging said primary and secondary seats of said tubular wall; means forming a passage connecting one end of said tubular wall with the other end thereof; means for producing a flow of fluid through said passage toward said secondary seat; and means in a position to intercept said flow, said means comprising a quantity of material adapted to absorb contained first fluid from said flow of fluid.

9. A stuffing box for use with a shaft and in a position between a first fluid and a second fluid disposed in first and second chambers, including: a tubular wall around said shaft in position between said chambers, there being a primary annular seat formed around said shaft at the end of said tubular wall confronting said first chamber and a secondary annular seat formed around said shaft at the end of said tubular wall confronting said second chamber; primary and secondary closure members on said shaft respectively engaging said primary and secondary seats of said tubular wall; means forming a passage connecting one end of said tubular wall with the other end thereof; means for producing a flow of fluid through said passage toward said secondary seat; and means in a position to intercept said flow, said means being adapted to separate said first fluid from said flow, and said means comprising a quantity of material having a positive affinity for said first fluid sufficient to extract contained first fluid from an emulsion of said first and second fluids.

10. A stuffing box for use with a shaft and in a position between a first fluid, which may contain moisture, and a second fluid, which it is desired to keep from contamination by moisture disposed in first and second chambers, including: a tubular wall around said shaft in position between said chambers, there being a primary annular seat formed around said shaft at the end of said tubular wall confronting said first chamber and a secondary wall confronting said second chamber; primary and secondary closure members on said shaft respectively engaging said primary and secondary seats of said tubular wall; means forming a passage connecting one end of said tubular wall with the other end thereof; means for producing a flow of fluid through said passage toward said secondary seat; and means in a position to intercept said flow, said means comprising a quantity of hygroscopic material.

11. A stuffing box for use with a shaft and in a position between a first fluid and a second fluid disposed in first and second chambers, including: a tubular wall around said shaft in position between said chambers, there being an inwardly facing primary annular seat formed around said shaft at the end of said tubular wall confronting said first chamber and an inwardly facing secondary annular seat formed around said shaft at the end of said tubular wall confronting said second chamber; primary and secondary closure members on said shaft within said tubular wall respectively engaging said primary and secondary seats of said tubular wall; means forming a passage connecting one end of said tubular wall with the other end thereof; means for producing a flow of fluid through said passage toward said secondary seat; and means in a position to intercept said flow, said means being adapted to separate first fluid from said flow.

12. A stuffing box for use with a shaft and in a position between a first fluid and a second fluid disposed in first and second chambers, including: a tubular wall around said shaft in position between said chambers, there being an inwardly facing primary annular seat formed around said shaft at the end of said tubular wall confronting said first chamber and an inwardly facing secondary annular seat formed around said shaft at the end of said tubular wall confronting said second chamber; primary and secondary closure members on said shaft within said tubular wall respectively engaging said primary and secondary seats of said tubular wall, said closure members being rotatable with and slidable upon said shaft; resilient means for forcing said closure members outwardly to engage said primary and secondary seats; means forming a passage connecting one end of said tubular wall with the other end thereof; means for producing a flow of fluid through said passage toward said secondary seat; and means in a position to intercept said flow, said means being adapted to separate first fluid from said flow.

13. A stuffing box for use with a shaft and in a position between a first fluid and a second fluid disposed in first and second chambers, including: a tubular wall around said shaft in position between said chambers, there being an inwardly facing primary annular seat formed around said shaft at the end of said tubular wall confronting said first chamber and an inwardly facing secondary annular seat formed around said shaft at the end of said tubular wall confronting said second chamber; primary and secondary closure members on said shaft within said tubular wall respectively engaging said primary and secondary seats of said tubular wall, said closure members rotating with said shaft; means for forcing said closure members and said primary and secondary seats into sealing engagement; means forming a passage connecting one end of said tubular wall with the other end thereof; means for producing a flow of fluid through said passage; and means in a position to intercept said flow, said means being adapted to separate first fluid from said flow.

14. A stuffing box for use with a shaft and in a position between a first fluid and a second fluid disposed in first and second chambers, including: a tubular wall around said shaft in position between said chambers, there being a primary annular seat formed around said shaft at the end of said tubular wall confronting said first chamber and a secondary annular seat formed around said shaft at the end of said tubular wall confronting said second chamber, there being a passage connecting the ends of said tubular wall; primary and secondary closure members on said shaft respectively engaging said primary and secondary seats of said tubular wall; and means in said passage disposed between the ends thereof for removing contaminating fluid from the fluid content of said passage which may engage said means.

15. A stuffing box for use with a shaft and in a position between a first fluid and a second fluid disposed in first and second chambers, including: a tubular wall around said shaft in position between said chambers, there being a primary annular seat formed around said shaft at the end of said tubular wall confronting said first chamber and a secondary annular seat formed around said shaft at the end of said tubular wall confronting said second chamber; primary and secondary closure members on said shaft respectively engaging said primary and secondary seats of said tubular wall; means forming a passage on the exterior of said tubular wall, said passage connecting one end of said tubular wall with the other end thereof; means for producing a flow of fluid through said passage toward said secondary seat; and means in a position to intercept said flow, said means being adapted to separate first fluid from said flow.

16. A stuffing box for use with a shaft and in a position between a first fluid, which may contain moisture, and a second fluid, which it is desired to keep from contamination by moisture disposed in first and second chambers, including: a tubular wall around said shaft in position between said chambers, there being a primary annular seat formed around said shaft at the end of said tubular wall confronting said first chamber and a secondary seat confronting said second chamber; primary and secondary closure members on said shaft respectively engaging said primary and secondary seats of said tubular wall; means forming a passage on the exterior of said tubular wall, said passage connecting one end of said tubular wall with the other end thereof; means for producing a flow of fluid through said passage toward said secondary seat; and means in a position to intercept said flow, said means comprising a quantity of hygroscopic material.

17. A stuffing box for use with a shaft and in a position between a first fluid and a second fluid disposed in first and second chambers, including: a sealing device surrounding said shaft between said first and second chambers, said sealing device comprising a tubular wall having its primary end exposed to the fluid in said first chamber and its secondary end exposed to the fluid in said second chamber, a primary sealing means around said shaft at the primary end of said tubular wall, and a secondary sealing means around said shaft at the secondary end of said tubular wall; walls forming a circulation passage having both ends connected to the interior of said tubular wall; pump means operatively connected to said shaft for producing a circulation flow of fluid from and to the interior of said tubular wall through said passage; and means in said passage to separate from said flow through said passage the first fluid which may be contained therein.

18. A stuffing box for use with a shaft and in a position between a first fluid and a second fluid disposed in first and second chambers, including: a sealing device surrounding said shaft between said first and second chambers, said sealing device comprising a tubular wall having its primary end exposed to the fluid in said first chamber and its secondary end exposed to the fluid in said second chamber, a primary sealing means around said shaft at the primary end of said tubular wall, and a secondary sealing means around said shaft at the secondary end of said tubular wall; walls forming a circulation passage having both ends connected to the interior of said tubular wall; means for producing a circulation flow of fluid from and to the interior of said tubular wall through said passage; and means in said passage to separate from said flow through said passage the first fluid which may be contained therein, said separating means comprising a body of material adapted to absorb contained first fluid from said circulation flow.

19. A stuffing box for use with a shaft and in a position between a first fluid and a second fluid disposed in first and second chambers, including: a sealing device surrounding said shaft between said first and second chambers, said sealing device having sealing means for preventing excessive leakage from said first chamber to said second chamber and providing guide walls for directing such small quantity of said first fluid as may work through said sealing means through a defined path, a portion of said path being longitudinal along said shaft; and means in said path for collecting said small quantity of said first fluid, whereby to prevent contamination of said second fluid thereby.

20. A stuffing box for use with a shaft and in a position between a first fluid and a second fluid disposed in first and second chambers, including: a sealing device surrounding said shaft between said first and second chambers, said sealing device having sealing means for preventing excessive leakage from said first chamber to said second chamber along the surface of said shaft, and guide walls for directing such small quantity of said first fluid as may work through said sealing means through a defined path; and means in said path, having chemical affinity for said first fluid, for collecting and holding said small quantity of said first fluid, whereby to prevent contamination of said second fluid thereby.

21. In combination in a sealing structure adapted to seal the junction of a shaft and a wall, one side of said wall communicating with a body of primary liquid and the other side of said wall communicating with a body of secondary liquid: a semi-effective sealing means at said junction of said shaft and said wall and forming an emulsion of said liquids when said shaft is moving; de-emulsifying means including means retaining the contaminating primary liquid for separating said primary liquid from said secondary liquid; pump means for delivering said emulsion to said de-emulsifying means; and means for returning the purified secondary liquid to said body of secondary liquid which is in communication with said other side of said wall.

22. In combination with a rotatable member: a shell including a stationary member extending in close proximity to said rotatable member, one side of the junction of said members communicating with a body of primary liquid and the other side of said junction communicating with a body of secondary liquid whereby an emulsion of said liquids forms in the space between said members when said rotatable member is rotating, said emulsion being thrown outward due to the rotation of said rotatable member; walls defining a chamber around said rotatable member and receiving said emulsion; and a de-emulsifying means in said chamber and separating any of said primary liquid from said emulsion, said de-emulsifying means including a body of material retaining said primary liquid of said emulsion, thus separating this primary liquid from the secondary liquid of said emulsion, the secondary liquid in said emulsion being returned to said body of secondary liquid.

23. In combination with a movable member: a stationary member extending in close proximity to said movable member, one end of the junction of said members communicating with a body of primary liquid; a tubular wall around said movable member and spaced therefrom to define a chamber containing a body of secondary liquid one end of said chamber communicating with the other end of said junction whereby an emulsion of said liquids is formed between said stationary and movable members; conducting means for conducting said emulsion to a position exterior of said tubular member; and de-emulsifying means spaced from said chamber and receiving emulsion from said conducting means to exert a positive treating action on said emulsion to separate said primary liquid in said emulsion from said secondary liquid in said emulsion the separated secondary liquid being conducted to that end of said chamber opposite said one end thereof which directly communicates with said other end of said junction.

24. In combination with a rotatable member: a stationary member extending in close proximity to said rotatable member, one side of the junction of said members communicating with a body of primary liquid and the other side of said junction communicating with a secondary liquid; a pump means in the form of a pumping member on said rotatable member at a position adjacent one side of said junction and throwing outward any emulsion of said liquids which forms at said junction when said rotatable member is rotating; and de-emulsifying means into which said pump means discharges said emulsion and adapted to separate said primary liquid from said secondary liquid, said de-emulsifying means returning the secondary liquid of said emulsion to said body of secondary liquid.

25. In combination with a movable member: a stationary member extending in close proximity to said rotatable member, one side of the junction of said members communicating with a body of primary liquid; a tubular wall terminating short of said stationary member to define a chamber about said movable member, said chamber communicating with a body of secondary liquid and with the other end of said junction to receive any intermixture of said liquids formed at said junction; and means for separating any of said secondary liquid from the primary liquid in said intermixture.

26. In combination: a rotatable member; a stationary member extending in close proximity to said rotatable member, one side of the junction of said members communicating with a first fluid and the other side of said junction communicating with a second fluid whereby an intermixture of said fluids takes place at said junction; pump means for pumping said intermixture from the vicinity of said junction; walls forming a passage means receiving the intermixture discharged from said pump means; and a separating means separating the first and second fluids of said intermixture and including a body of material retaining the contaminating first fluid in said intermixture but passing the second fluid therein.

27. In combination: a shell, there being a first fluid outside said shell and a second fluid inside said shell; a shaft extending from said shell, an intermixture of said fluids forming at the junction of said shaft and said shell; a sealing means spaced from said junction at which said intermixture is formed, one side of said sealing means communicating with said second fluid in said shell; and means for maintaining a purified portion of said second fluid in communication with the other side of said seal, said means including a separating means receiving the intermixture of said fluids and separating therefrom the contaminating first fluid, the purified second fluid being returned to communicate with said other side of said sealing means.

28. In combination: a shell, there being a first fluid outside said shell and a second fluid inside said shell; a shaft extending from said shell; a first sealing means around said shaft and communicating on opposite sides with said fluids whereby an intermixture of said fluids is formed at said first sealing means; an auxiliary sealing means around said shaft and spaced from said first sealing means, there being a chamber extending between said sealing means and into which said intermixture moves, one side of said auxiliary sealing means communicating with said second fluid inside said shell; and means for maintaining adjacent the other side of said auxiliary sealing means a purified second fluid, said means including a treating means for treating the intermixture present in said chamber to separate the contaminating first fluid leaving the purified second fluid which is discharged in said chamber in communication with said other side of said auxiliary sealing means.

29. In combination: a shell, there being a first fluid outside said shell and a body of a second fluid inside said shell; a rotatable shaft extending from said shell; a first sealing means around said shaft and forming an intermixture of said fluids when said shaft rotates; a second sealing means around said shaft and spaced from said first sealing means, there being a chamber extending between said sealing means; pumping means including a pumping member around and driven by said shaft and drawing fluid through said chamber from the vicinity of said second sealing means and drawing said intermixture from the vicinity of said first sealing means; walls defining a passage receiving the discharge of said pump; and a de-emulsifying means communicating with said passage and exerting a positive action on the contaminating first fluid to effect separation of this first fluid from the second fluid in the mixture pumped by said pumping means, said de-emulsifying means returning said second fluid of said mixture to said body of second fluid inside said shell.

CLARENCE J. COBERLY.